Figure 1:
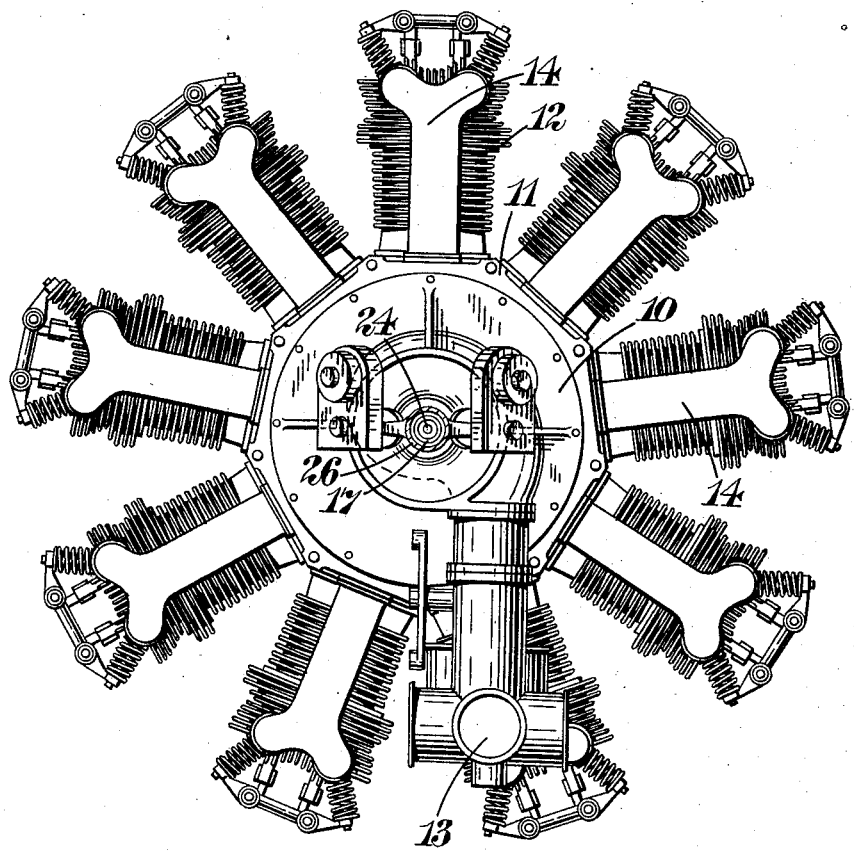

Dec. 9, 1930.  A. H. R. FEDDEN  1,784,788
LUBRICATION OF INTERNAL COMBUSTION ENGINES
Filed March 8, 1928  2 Sheets-Sheet 1

Inventor
Alfred H. R. Fedden
by Wilkinson & Ginsta
Attorneys.

Patented Dec. 9, 1930

1,784,788

UNITED STATES PATENT OFFICE

ALFRED HUBERT ROY FEDDEN, OF BRISTOL, ENGLAND, ASSIGNOR TO THE BRISTOL AEROPLANE COMPANY LIMITED, OF BRISTOL, ENGLAND, A BRITISH COMPANY

LUBRICATION OF INTERNAL-COMBUSTION ENGINES

Application filed March 8, 1928, Serial No. 260,091, and in Great Britian April 6, 1927.

This invention is for improvements in or relating to the lubrication of internal-combustion engines which are provided with a compressor or supercharger, and is applied to engines of the radial type. In such engines the lubrication is effected principally through the hollow crank-shaft, and usually the lubricating oil is under considerable pressure, say 40 lbs. per square inch.

It is convenient for various reasons to construct the compressor in such a manner that it is coaxial with and surrounds the crank-shaft, and to provide for the lubrication of the compressor in the general lubrication system of the engine. Difficulties arise, however, in that the compressor requires a smaller supply of lubricant than does the engine, and this difficulty is intensified in that the suction existing in the compressor tends to draw the oil in and increase the consumption still more. The object of this invention is to provide means for lubricating the compressor in an engine of the type above set forth.

According to this invention there is provided in an internal-combustion engine fitted with a compressor, of the type above described, the combination with the crank-shaft, of means for providing a closed chamber therein, means for supplying lubricant to the said chamber, and means permitting communication from the chamber to those parts of the compressor which require lubrication. In this way the supply of lubricant to the compressor can be limited to a suitable amount as compared with the supply to the engine.

In a preferred form of this invention, it comprises the combination with the crank-shaft, of a sleeve fitted therein to provide an annular lubricant chamber, means for supplying lubricant to this chamber at a lower rate than it is supplied to the crank-shaft, and means providing communication from the chamber to the parts of the compressor to be lubricated. Preferably the lubricant is supplied to the annular chamber aforesaid through a main bearing of the crank-shaft by means of an opening in the shaft which provides intermittent communication between the oil supply and the annular chamber.

According to another feature of this invention the opening aforesaid in the crank-shaft which provides intermittent communication for the supply of oil, may be provided with a centrifugally-opened check-valve, so that the rate of supply of lubricant is further controlled in accordance with the speed of the engine.

According to yet another feature of this invention the spaces in the compressor and its gearing whereto the lubricant is admitted are shut off from the space in which a low pressure or suction exists whilst the compressor is working, by a face-to-face contact of two parts which are arranged to have only a small clearance between them; this small clearance acts as a baffle to restrict the flow of oil resulting from the suction existing in the compressor.

A particular embodiment of the present invention will now be described, by way of example only, with reference to the accompanying drawings, in which—

Figure 2:
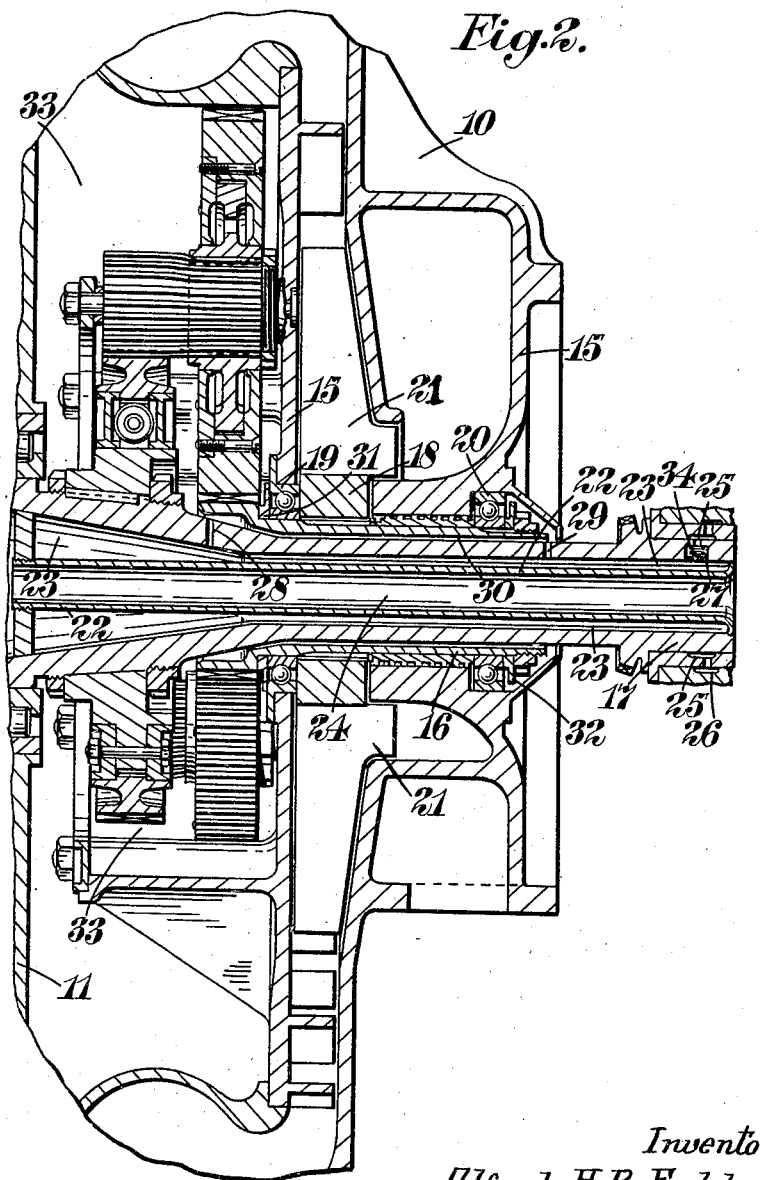

Figure 1 diagrammatically illustrates a radial cylinder internal-combustion engine embodying the present invention, and Figure 2 shows diagrammatically and in section the rotary compressor and part of the engine crank-shaft.

Like reference numerals indicate like parts in both the figures of the drawing.

The engine has its cylinders 12 arranged round a crank case 11 to which is secured a rotary compressor 10, the latter delivering the mixture from a carburettor 13 through separate induction pipes 14 to each cylinder. The compressor 10 comprises an annular casing 15 which surrounds the crank-shaft 17 of the engine and carries a hollow shaft 16 surrounding the crank-shaft. This hollow shaft carries the rotor of the compressor, and is driven from the engine crank-shaft at a speed higher than that of the crank-shaft. The rotor shaft 16 is mounted in ball bearings 19, 20 which are carried on the compressor-casing 15, and it will be appreciated that one or both of these bearings is exposed on one side to the suction maintained within the compressor, when working, at the roots of the blades 21.

A sleeve 22 is fitted within the engine crank-shaft 17 so as to provide an annular space 23 closed at each end around the inner surface of the crank-shaft over a suitable length of it adjacent the compressor, and this construction leaves a clear central passage 24 for the ordinary lubricating system of the engine. Oil is supplied to a cavity 25 in one of the main bearings 26 of the crank-shaft opposite this annular space 23, and a radial hole 27 in the crank-shaft provides, by rotation of the crank-shaft, intermittent communication from the cavity 25 in the bearing to the annular space 23. Oil which is supplied under pressure to the cavity is therefore admitted slowly to the annular space, and its pressure is thereby reduced.

Communication is provided from the annular space 23 to those parts of the compressor which require lubrication by means of radial openings 28, 29 through the crank-shaft to the annular space 30 inside the hollow shaft 16 which carries the rotor of the compressor, an opening preferably being provided at or near each end of the rotor shaft. By this means the lubricant can pass to the outer sides of the bearings 19, 20 which carry the rotor shaft, that is to say, those sides which are not exposed to the suction maintained within the compressor. When ball-bearings are used in these places, a plate such as 31, 32 is provided to bridge the gap between the inner and outer rings of the bearing, and this plate, which rotates with the moving ring, is arranged to have only a small clearance from the stationary ring, the clearance being of the order of 0.08 mm. This small clearance permits only a very small flow of oil into the bearings despite the suction which is tending to draw up oil in that direction. In addition to lubricating the main bearings of the compressor shaft, the supply of oil from the annular chamber aforesaid also lubricates the gearing connecting the crank-shaft and the rotor shaft, since it is admitted to the space 33 containing such gearing.

As described above the lubricant is admitted from a cavity 25 in the main bearing through an opening 27 in the crank-shaft to the annular chamber 23 aforesaid, and this opening 27 may be provided with a centrifugally-operated valve 34 which restricts the passage when the shaft is stationary or rotating only slowly but opens it at higher speeds. In this way the rate of supply of the lubricant to the annular chamber 23, and therefore to the compressor, is further controlled according to the requirements of any particular conditions of running.

It will be seen that this invention provides an effective means for lubricating the compressor and its gearing, having due regard to the comparatively small requirements of such parts, without the necessity of providing a system which is separate from the general system of the engine. Whilst a specific construction has been described, the invention is not limited thereto, for obviously various modifications in the construction and arrangement may be used without departing from the scope of the invention as above set forth.

I claim:

1. Means for lubricating a rotary internal combustion engine equipped with a compressor and having a hollow crank shaft, comprising a sleeve spaced from and sealed within the crank shaft to provide an annular lubricant chamber therein, said crank shaft having a radial opening therein leading to the annular chamber for supplying lubricant thereto, and a centrifugally opened check valve in said opening of the crank shaft, said crank shaft also having radial openings therethrough for supplying the lubricant to parts to be lubricated.

2. In an internal combustion engine fitted with a compressor of the type described, the combination of means for providing a closed chamber in the engine crank shaft, means for supplying lubricant to said chamber, said crank shaft having openings therethrough permitting the outflow of lubricant from the chamber, a compressor sleeve surrounding the crank shaft between said openings through the latter for separating the interior of the compressor from the chamber in the crank shaft, compressor bearings spaced apart on said compressor sleeve, and shield members on the ends of the sleeve outwardly of the bearings and having a small clearance only between the members and the bearings to restrict the flow of lubricant to the bearings.

3. The combination of an internal combustion engine, a rotary compressor, a sleeve fitted in the engine crank shaft to provide an annular lubricant chamber, said crank shaft having a check controlled opening providing intermittent communication between the lubricant supply and the annular chamber, spaced apart compressor bearings about the crank shaft, a compressor sleeve between the bearings and between the latter and the crankshaft, said crank shaft having openings therein leading to the interior of the sleeve, and means between the bearings and the ends of the compressor sleeve for restricting the flow of lubricant from within the sleeve through the bearings and to the interior of the compressor.

In testimony whereof I affix my signature.

ALFRED HUBERT ROY FEDDEN.